L. H. BIGELOW.
COW TAIL HOLDER.
APPLICATION FILED APR. 27, 1909.

986,894.

Patented Mar. 14, 1911.
2 SHEETS—SHEET 1.

Witnesses
J. C. Simpson
John A. Dunegan

Inventor
Levi H. Bigelow.
By Chandler & Chandler
Attorneys

L. H. BIGELOW.
COW TAIL HOLDER.
APPLICATION FILED APR. 27, 1909.
986,894.
Patented Mar. 14, 1911.
2 SHEETS—SHEET 2.
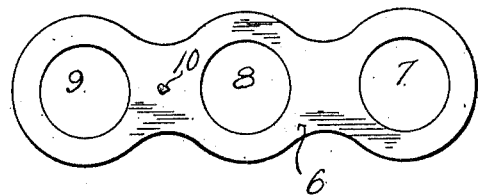
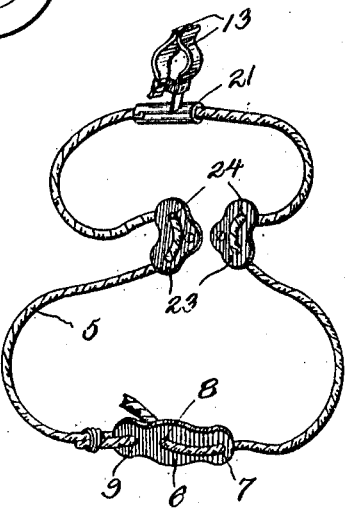
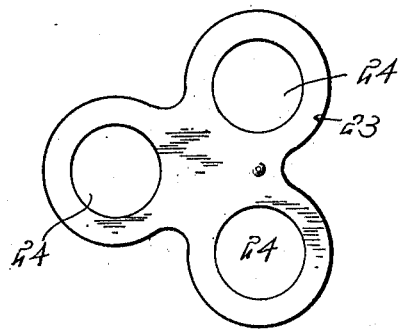
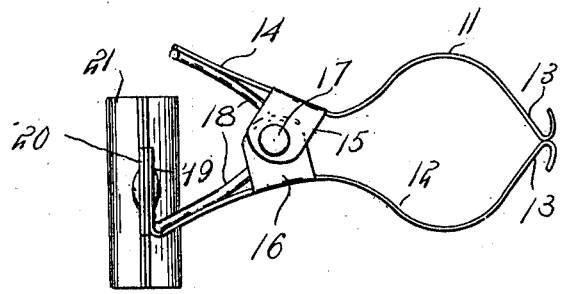
Witnesses
J. C. Simpson
John A. Donegan
Inventor
Levi H. Bigelow.
By Chandler & Chandler
Attorneys

UNITED STATES PATENT OFFICE.

LEVI H. BIGELOW, OF FREMONT, MICHIGAN.

COW-TAIL HOLDER.

986,894.

Specification of Letters Patent. Patented Mar. 14, 1911.

Application filed April 27, 1909. Serial No. 492,436.

*To all whom it may concern:*

Be it known that I, LEVI H. BIGELOW, a citizen of the United States, residing at Fremont, in the county of Newaygo, State of Michigan, have invented certain new and useful Improvements in Cow-Tail Holders; and I do hereby declare the following to be a full, clear, and exact description of the invention, such as will enable others skilled in the art to which it appertains to make and use the same.

This invention relates to improvements in tail holders and more particularly to the kind employed to prevent cows from moving their tails during milking.

One object of the invention is the provision of a device which is adapted to hold the animal's tail against movement without in the least producing any severe pressure on the tail such as would cause pain or injury to the animal.

Another object is the provision of a means for preventing the animal from kicking.

A further object is the provision of an improved form of coupler to be used in connecting the ends of the breeching and the ends of the girth.

With these and other objects in view as will more fully hereinafter appear, the present invention consists in certain novel details of construction and arrangement of parts, hereinafter fully described, illustrated in the accompanying drawings and more particularly pointed out in the appended claim, it being understood that various changes in the form, proportion, size and minor details of the device may be made without departing from the spirit or sacrificing any of the advantages of the invention.

Figure 1:
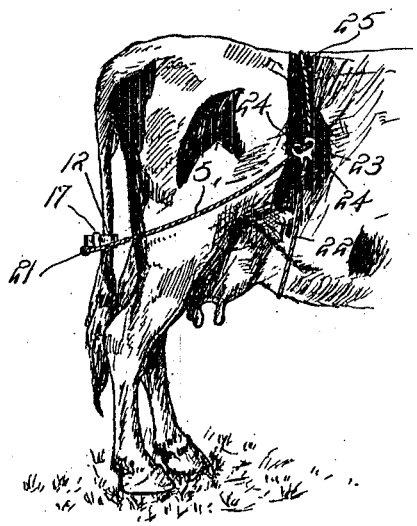
Figure 2:
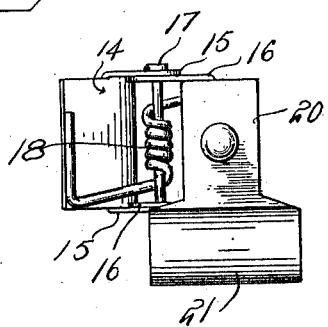
Figure 3:
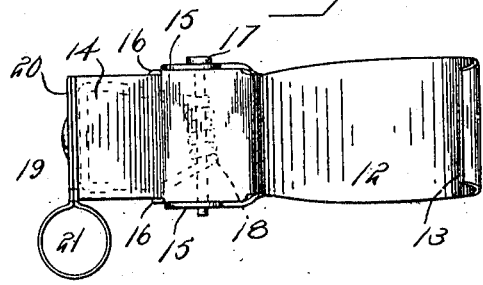
Figure 4:
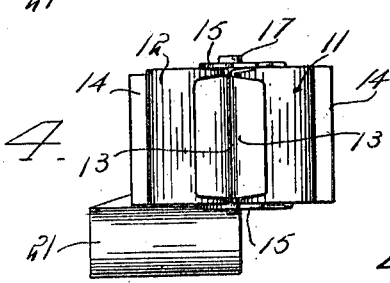

In the accompanying drawings forming part of the specification: Figure 1 is a side elevation of the device showing its position on the animal. Fig. 2 is a rear view of the same. Fig. 3 is a detailed side elevation of the tail clamp. Fig. 4 is an end view of the same. Fig. 5 is a plan view of the coupling member for the girth and breeching. Fig. 6 is a similar view of the coupling member for the ends of the breeching. Fig. 7 is a plan view of the tail clamp. Fig. 8 is a perspective view of the hopple rope and its associated parts.

Similar numerals of reference are employed to designate corresponding parts throughout.

The device consists essentially in a breeching, a girth and a clamp for holding the tail. The breeching is of a length to completely straddle the animal's hips and in the present instance is designated by the numeral 5. The ends of the breeching are secured over the animal's back and at a point in advance of the hips and held by a coupler; the latter is preferably formed of a single piece of cast metal 6 and is provided with three openings designated by 7, 8 and 9. The coupler is oblong in contour and on one face is provided with an upstruck portion 10 disposed between the intermediate and one of the end openings.

In the use of the device one end of the breeching is secured in the end opening 7, and in the openings 8 and 9 where it is held by the upstruck stud 10, it being understood that the breeching has first been adjusted to the size of the animal. The breeching is then placed over the animal's hips so that the coupled ends will lie in advance of the hips, and the tail clamp, to be described later, secured to the animal's tail.

The tail clamp in the present instance is shown to consist of a pair of pivoted jaw members designated by the numerals 11 and 12. Each of these members is preferably formed of a single piece of sheet metal curved outwardly and inwardly adjacent one end as shown at 13 and at the opposite end curved in an outwardly direction to provide a shank 14. Inwardly projecting lugs 15 and 16 are formed on each of the jaw members and at their intermediate portions and are provided with openings for the reception of a suitable pivot pin 17. A coil spring 18 surrounds the pivot 17 and has its opposite terminals bearing on the inner faces of the opposite curved shanks 14. This construction forces the opposite or inwardly curved ends together and the opposite curving of the parts 13 presents an opening sufficiently wide for the animal's tail to enter. One of the shanks 14 is adjacent its terminal bent inwardly and at right-angles so as to provide an ear 19, and fixedly secured to the ear 19 is what will subsequently be termed a breeching receiving portion. This member consists of a shank portion 20 which is rigidly secured to the ear 19 and a tubular portion 21, the latter being disposed below the lower edge of the ear 19 and parallel therewith. The diameter of the tubular portion 21 is sufficient to permit the breeching 5 to be inserted therein and the normal position of this part is at the intermediate portion of the breeching 5, so that when the parts are in position as shown in Fig. 1 and the breeching adjusted, and placed over the body of the animal as before described, the jaws 11 and 12 are clasped around the animal's tail.

It frequently happens during the operation of milking that animals are prone to kick causing considerable damage by frequently upsetting the milk pail. In order to overcome this tendency a girth 22 is employed and with it a fastening member 23.
The latter is preferably formed of cast metal and in contour corresponds approximately to the shape of a three leaf clover. Formed in each of the leaves is an opening 24. In the use of the device two of these members are employed and are arranged directly in advance of the hips of the animal. The girth 22 is of sufficient length to embrace that portion of the animal's body directly in advance of the hips and when in position one end of the girth is secured in one of the openings 24 and the opposite end brought beneath the animal's body and secured in the corresponding opening in the opposite holder. In order that the girth may be detachably secured to the member 23 it is preferred that one of its ends shall be provided with a snap hook 26, while the other end may be tied through the opening in the opposite member. The members 23 are so arranged on the animal's body that two of the openings will lie in a vertical plane, the ends of the girth being secured in the lower openings while a back strap 25 has its opposite ends secured in the upper openings. With the use of this device the breeching 5 has its opposite ends secured in the remaining opening 24 as clearly shown in the drawings.

From the foregoing it can be seen that I have provided a tail holder which is simple in construction, comparatively inexpensive to manufacture, readily adjustable to the various sizes of animals and easy to operate and adapted to perform its required function without in any way injuring the animal; with the addition of the girth strap 22 it can be seen that the animal will be positively prevented from kicking since the girth can be tightened to any degree of tightness around the animal's body.

Having thus described my invention, what is claimed as new, is:—

A combined cow tail holder and anti-kicking device comprising a pair of rope clamps, a hopple rope adjustably mounted in said rope clamps and having free ends, an adjusting device permanently connected to one end and adjustably connected to the opposite end, a tail holding device adjustably mounted upon the hopple rope, and a belly band removably connecting the rope clamps.

In testimony whereof, I affix my signature, in presence of two witnesses.

LEVI H. BIGELOW.

Witnesses:
T. S. FRY,
W. D. SARGEANT.

Copies of this patent may be obtained for five cents each, by addressing the "Commissioner of Patents, Washington, D. C."